(12) United States Patent
Holmann et al.

(10) Patent No.: US 7,182,892 B2
(45) Date of Patent: *Feb. 27, 2007

(54) GAS ASSISTED INJECTION MOLDING WITH FIXED VOLUME GAS RESERVOIR AND TEMPERATURE CONTROL

(75) Inventors: Gregory A. Holmann, Canton, MI (US); James Hendry, Brooksville, FL (US)

(73) Assignee: Lear Corporation, Southfield, MI (US)

( * ) Notice: Subject to any disclaimer, the term of this patent is extended or adjusted under 35 U.S.C. 154(b) by 364 days.

This patent is subject to a terminal disclaimer.

(21) Appl. No.: 10/709,390

(22) Filed: Apr. 30, 2004

(65) Prior Publication Data

US 2005/0242476 A1    Nov. 3, 2005

(51) Int. Cl.
B29D 22/00    (2006.01)

(52) U.S. Cl. .............. 264/40.1; 264/572; 425/130; 425/135; 425/145

(58) Field of Classification Search .............. 264/40.1, 264/572; 425/130, 134, 135
See application file for complete search history.

(56) References Cited

U.S. PATENT DOCUMENTS

| | | |
|---|---|---|
| 4,824,732 A | 4/1989 | Hendry |
| 4,923,666 A | 5/1990 | Yamazaki |
| 4,948,547 A | 8/1990 | Hendry |
| 5,039,463 A | 8/1991 | Loren |
| 5,047,183 A | 9/1991 | Eckardt |
| 5,110,533 A | 5/1992 | Hendry |
| 5,112,563 A | 5/1992 | Baxi |
| 5,118,455 A | 6/1992 | Loren |
| 5,198,238 A | 3/1993 | Baxi |
| 5,273,707 A | 12/1993 | Carroll |
| 5,458,846 A | 10/1995 | Carroll |
| 5,639,405 A | 6/1997 | Erikson |
| 5,643,527 A | 7/1997 | Carroll |
| 5,670,112 A | 9/1997 | Csongor |
| 5,728,325 A | 3/1998 | Blankenburg |
| 5,730,926 A | 3/1998 | Matsumoto |
| 5,820,889 A | 10/1998 | Erikson |
| 5,939,103 A | 8/1999 | Erikson |
| 5,972,276 A | 10/1999 | Yasuda |
| 5,997,797 A | 12/1999 | Heuchert |
| 6,019,935 A | 2/2000 | Eckardt |
| 6,294,126 B1 | 9/2001 | Eckardt |

(Continued)

FOREIGN PATENT DOCUMENTS

DE    19613134 A1    10/1997

(Continued)

Primary Examiner—Suzanne E. McDowell
(74) Attorney, Agent, or Firm—Earl LaFontaine; Artz & Artz, P.C.

(57) ABSTRACT

A method and system for forming an injection molded plastic part. After the injection of plastic material has started, a volume of gas from a fixed volume reservoir is introduced into the plastic material at a low pressure forming a hollow cavity. The introduction of this volume of gas is initiated when the temperature of the plastic material in the mold has reached a predetermined value. After the mold is filled and packed with plastic, pressurized gas is introduced into the hollow cavity forming the completed plastic part.

20 Claims, 4 Drawing Sheets

| U.S. PATENT DOCUMENTS | | | | FOREIGN PATENT DOCUMENTS | | |
|---|---|---|---|---|---|---|
| 6,375,892 B2 | 4/2002 | Thomas | DE | 196 27 493 A1 | 1/1998 |
| 6,432,352 B1 | 8/2002 | Csongor | EP | 0317 176 A2 | 5/1989 |
| 6,468,465 B1 | 10/2002 | Hildebrand | EP | 0950193 A1 | 1/1996 |
| 6,546,311 B2 | 4/2003 | Brown | GB | 2396133 A | 11/2003 |
| 2003/0015815 A1 | 1/2003 | McClelland | WO | WO-98/39150 A | 3/1998 |

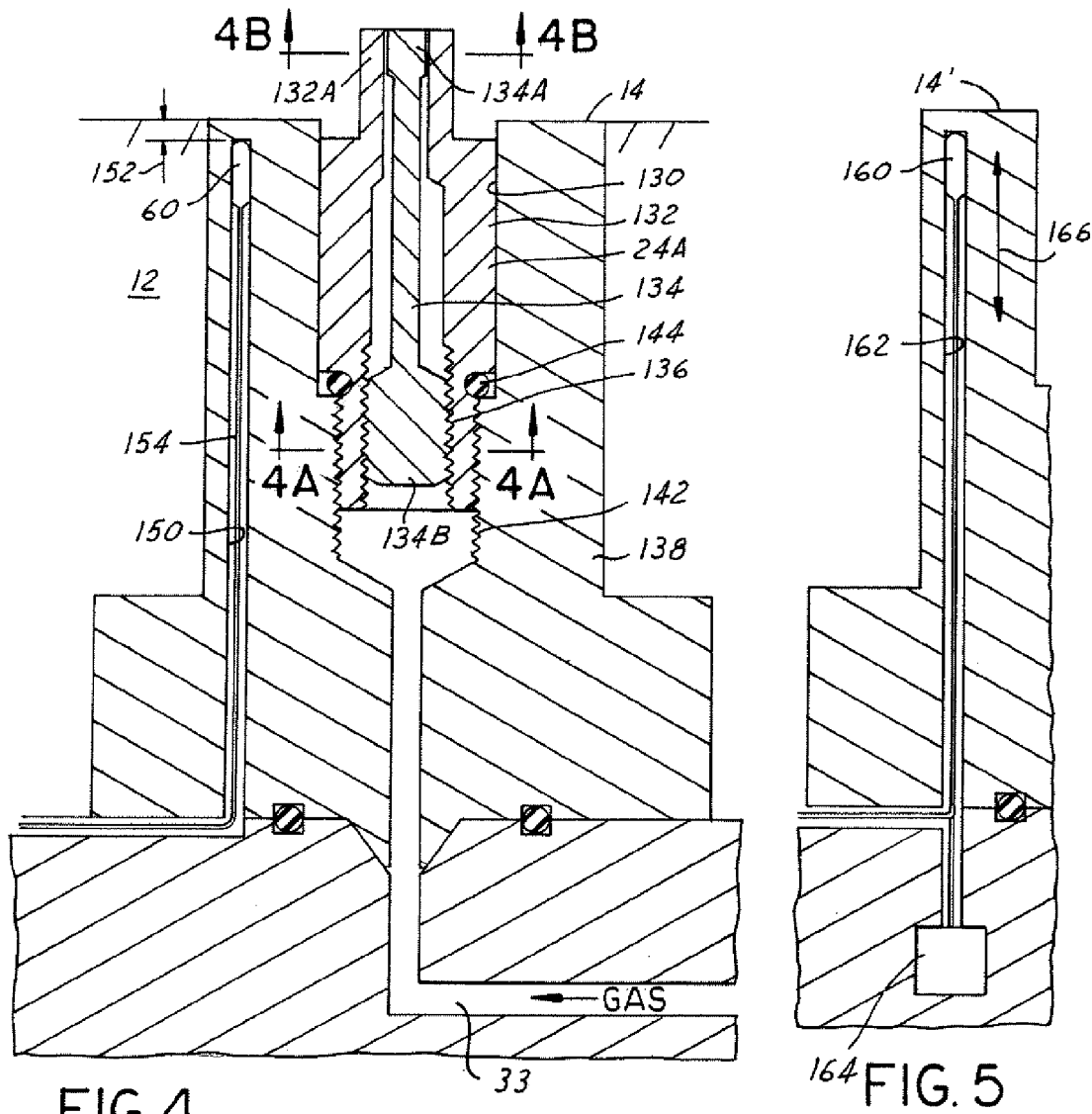
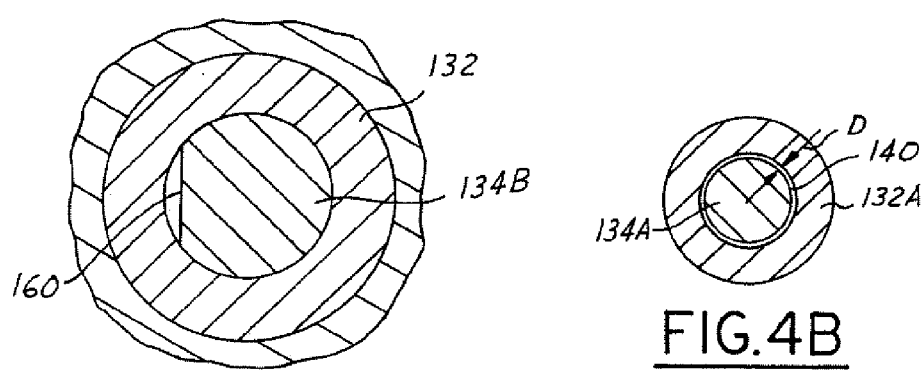
FIG. 4
FIG. 4A
FIG. 4B
FIG. 5

GAS ASSISTED INJECTION MOLDING WITH FIXED VOLUME GAS RESERVOIR AND TEMPERATURE CONTROL

CROSS REFERENCE TO RELATED APPLICATIONS

This subject matter is related to U.S. application Ser. No. 10/709,388, entitled "Gas Pin With Thermocouple for Gas Assisted Injection Molding" which is filed on the same date herewith and the subject matter of which is hereby incorporated by reference herein.

BACKGROUND OF INVENTION

The present invention relates to plastic injection molding systems and more particularly to gas-assisted plastic injection molding systems and processes.

There are numerous known systems for plastic injection molding. In conventional plastic injection molding systems, plastic pellets are melted in an injection molding machine and advanced by a screw ram into a mold cavity, typically through one or more sprue bushings, a manifold, and/or a hot runner system. The mold cavity is formed between two mold halves (a core member and a cavity member). The two halves of the mold are clamped, typically under high pressure, and the plastic is injected into the mold cavity, again under significant pressure in most instances. The molten plastic material in the cavity is allowed to cool and harden in the cavity, typically by a cooling system which circulates a cooling fluid through one or more of the mold members. When the part is sufficiently hardened, the mold is opened and the part is removed, typically by one or more ejector pins.

Some of the known systems utilize a gas in the injection molding process and are commonly known as "gas-assisted injection molding" systems. In these systems, the gas is injected into the molten plastic material through the plastic injection nozzle itself, or through one or more pin mechanisms strategically positioned in the mold, sprue bushings, manifold, or hot runner systems. It is also possible to inject the gas directly into the molten plastic in the barrel of the injection molding machine. The gas, which typically is an inert gas such as nitrogen, is injected under pressure and forms one or more hollow cavities or channels in the molded part. The pressurized gas applies an outward pressure, forcing the plastic against the mold surfaces while the article solidifies. This helps provide a better surface on the molded article, and also reduces or eliminates sink marks and other surface defects. The use of pressurized gas also reduces cycle time as the gas is introduced and/or migrates to the more fluent inner volume of the plastic and replaces plastic in those parts which would otherwise required an extended cooling cycle. The benefits of gas-assisted injection molding processes are well known and include the cost savings through the use of less plastic material, producing parts which are lighter in weight, and producing parts which have better surface definitions and finishes.

In the plastic injection molding art, the usual challenges facing the product designer include designing an article having the requisite strength for the product application and satisfactory surface finish as well as avoiding excessive weight, surface distortions, and increased cycle time. For flat or thin products, it is typical to include one or more rib members in the design to provide relative strength and structure for a molded article. The rib members are typically thicker than the molded article, and the rib members, along with any other desired thicker portions, increase the weight material usage, and cycle time of the plastic article. These members and/or portions also often induce sink marks and other surface defects due to thermal gradients in the area of the thickened portions.

Where the rib members or other portions of the article in which the gas is being introduced are elongated, it is often difficult to provide a satisfactory molded article for additional reasons. For example, if the pressure of the gas is too great as it enters the mold cavity, there is a risk that it may rupture or blow out the plastic within the mold cavity, i.e., the gas is not contained within the molten plastic material. Also, it is often difficult to have the gas migrate along the full length of an elongated, thicker plastic section, thus creating a product which has an uneven thickness and cooling cycle. This can lead to undesirable stresses and/or deformation of the molded part.

Some gas-assisted plastic injection molding systems and processes have been developed in order to overcome some of the above-mentioned problems. In some of these processes, secondary reservoirs or cavities are provided adjacent the molded part or elongated rib members in order to collect and contain the plastic material which is forced out of the article or rib member by the pressurized gas. Although many of these gas-assisted injection molding systems and processes operate satisfactorily and have produced commercially acceptable plastic injection molding parts and components, these processes use excess plastic material and require excess processing steps. There is a need for improved systems and processes in the gas-assisted injection molding field which do not utilize secondary cavities, particularly since such processes use excess plastic which often cannot be reused, or which requires capturing and regrinding.

SUMMARY OF INVENTION

An object of the present invention is to provide an improved gas-assisted injection molding system and process. It is another object of the present invention to provide an improved gas-assisted injection molding process and system for making plastic parts and components in which a secondary cavity is not utilized or required.

It is also an object of the present invention to provide an improved method and system for injection molding plastic parts with structural rib members and the like, particularly elongated members. It is a further object of the present invention to provide a gas-assisted injection molded system and process in which the introduction of gas and plastic in the mold are controlled in order to provide a satisfactory product in an improved and more beneficial manner.

It is a still further object of the present invention to provide a gas-assisted plastic injection molding system and process which does not depend on time-distance or pressure to trigger the injection of the gas into the plastic material. Some conventional methods utilize linear position of the ram or machine screw in the injection molding machine to determine when to inject the gas into the mold. This is often unreliable and is limited by the condition of the molding machine and any wear properties of its components.

In accordance with the objects of the present invention, a system and method for gas-assisted injection molding is provided wherein a fixed volume gas reservoir is utilized, and the activation of the gas injection is controlled by a thermocouple or equivalent device which senses the melt temperature of the injected plastic material. After the injection of the plastic material into the mold is initiated, a fixed volume-variable pressure gas storage chamber or reservoir is activated to inject gas into the flowing stream of heated plastic material. The gas from the fixed volume reservoir enters the plastic material at a relatively low pressure and forms an initial cavity in the plastic material, particularly in the designated rib member or thicker portion. At a preset temperature, the volume of gas in the reservoir is released into the mold. This allows the mass in the rib member or thicker section to be displaced into other portions of the mold cavity.

The activation of the gas injection from the fixed volume reservoir is controlled by a temperature sensitive device or sensor, such as a thermocouple, which senses the melt temperature of the plastic material as the plastic material passes over it or adjacent to it. The temperature sensitive device or sensor can be incorporated in the gas pin itself, or positioned adjacent to the gas pin along a surface of the mold cavity. In this regard, the gas pin can be a modified ejector pin modified with placement of a thermocouple positioned in its center.

The temperature sensitive device can also be adjustable or movable relative to the surface of the mold cavity as necessary in order to be able to effectively time the activation of the gas injection from the fixed volume reservoir. The temperature and timing depends on a number of factors, such as the size of the molded component, the type of plastic material utilized, the volume of the hollow section to be produced in the rib member or thicker portion, the speed and pressure of the plastic injection, and the like.

Once the gas from the fixed volume reservoir is injected into the plastic material, the remainder of the plastic material is injected into the mold cavity. Preferably, the plastic injection process is continuous. Once the mold is filled with plastic material, additional plastic material is packed into the mold cavity. In this regard, as the plastic material flows through the mold cavity in order to fill it, the low pressure gas volume in the rib member or thicker portion will extend substantially along the full length of the rib member or thicker portion, creating the requisite hollow portion for the component or molded part.

Thereafter, pressurized gas is introduced into the molded part through one or more gas pins which pressurizes and fully forms the hollow cavity in the rib member or thicker portion, and at the same time forces the plastic material against the walls or surfaces of the mold cavity, creating the desired superior surface characteristics on the molded part.

After the pressurized gas is introduced into the molded part, the fixed volume reservoir is recharged. Once the plastic has cooled and solidified sufficiently, and the gas is vented from the hollow portions of the molded part, the mold is opened and the part is ejected (preferably by one or more ejector pins).

In an alternate embodiment, a fiber optic sensor or member could be utilized to detect the presence of plastic material passing over it in order to trigger the release of gas from the fixed volume container.

With the present invention, the use of secondary reservoirs is unnecessary and the existence of hesitation marks on the molded products is illuminated. The inventive system and method also do not depend on time, distance, or pressure to trigger the injection of the gas. The use of pressure to trigger gas injection, for example, often allows the gas to advance beyond the melt front, creating an unacceptable product.

The above objections and other objects, features, and advantages of the present invention are readily apparent from the following detailed description of the preferred embodiments for carrying out the invention when taken in accordance with the accompanying drawings and appended claims.

BRIEF DESCRIPTION OF DRAWINGS

FIG. 4 illustrates the use of a gas pin and associated thermocouple in accordance with a preferred embodiment of the present invention.

FIGS. 4A and 4B are cross-sections of the gas pin member illustrated in FIG. 4, the cross-sections being taken along lines AA and BB, respectively.

FIG. 5 illustrates an alternate thermocouple mechanism which can be used in accordance with the present invention.

DETAILED DESCRIPTION

Figure 1:
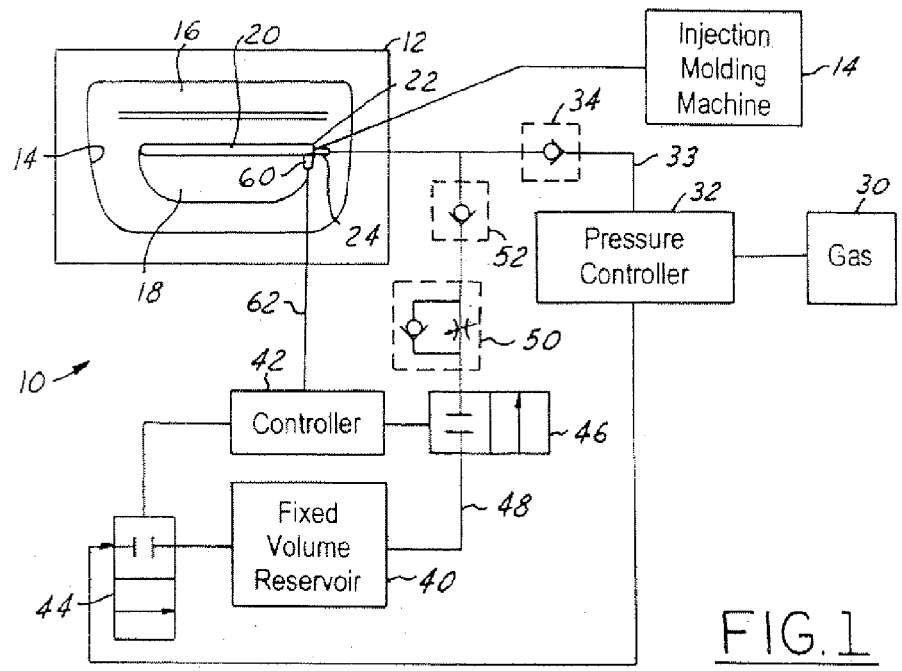
FIG. 1 is a schematic diagram of a preferred embodiment of the present invention.

The present invention is particularly suitable for providing hollow rib structures for structural reinforcement of decorative or non-decorative trim components and panels using gas-assisted plastic injection molding systems and processes. A preferred embodiment of the present invention is shown in FIG. 1 and designated generally by the reference numeral 10. In this regard, even though the present invention is illustrated and disclosed in accordance with one or more preferred embodiments of the inventive system and process, and is described for use with rib structures, it is to be understood that the present invention is not limited to such preferred embodiments or uses. Instead, the present invention should be entitled to the scope afforded to it by the following description and appended claims.

The system 10 shown in FIG. 1 includes a mold 12 which is positioned in and part of an injection molding machine 14. As is commonly known in the art, there are a number of injection molding machines which can be used to inject plastic material into a mold cavity. Plastic pellets are melted in the injection molding machine and advanced by a screw ram into the mold cavity 14. In this regard, in the example shown in FIG. 1, the mold cavity is provided in the shape of an interior door panel 16 for an automobile or other vehicle. The door cavity includes a map pocket 18 which has a rib member 20 along the open upper surface thereof. In accordance with the molding of this particular product, the rib member 20 is preferably molded with a hollow cavity in it for various aesthetic and manufacturing reasons.

Mold cavity 14 in mold 12 is formed or machined in the precise shape of the final plastic component to be manufactured, which in this case is the interior door panel 16. The two mold halves of the mold are connected to platens (not shown) on the injection molding machine which separate and close in accordance with the injection cycle and system. The injection molding machine 14 also includes a nozzle member (see FIG. 6) which is placed in contact with the mold and which injects molten plastic material melted in the plastic molding machine into the mold cavity through the nozzle. Also, in the examples shown, the plastic material is injected into one end 22 of the rib member 20.

A gas pin member 24, which can be of any conventional type, is also positioned at or adjacent the end 22 of the rib member 20. Preferably, the gas pin member extends into the mold cavity 14 in a conventional manner and which is described in more detail below.

Pressurized gas from a gas storage or generator mechanism 30 is injected by means of a pressure controller 32 into the plastic material in the mold cavity through the gas pin member 24. The gas can be provided to the pressure controller 32 from any conventional source, such as a gas generator, pressurized gas bottle, or the like. All of these are known in the art and are conventional, and do not need to be discussed or set forth in more detail herein. In the system 10 shown in FIG. 1, a check valve 34 is provided between the pressure controller and the gas pin 24 so that the gas only proceeds in one direction and cannot return to the controller. The pressure controller 32 regulates the flow of gas through conduit 33 to the gas pin and thus into the plastic material in the mold cavity.

The pressurized gas can be any conventional gas that is conventionally used in gas-assisted injection molding systems and processes, such as air, carbon dioxide, nitrogen, or the like. Preferably, however, the gas is an inert gas such as nitrogen which is commonly used today.

The pressure controller 32 is also utilized to fill a fixed volume reservoir 40 with a defined quantity or volume of gas. The reservoir 40 can be of any conventional type. A centralized controller 42 is utilized to operate a two-way valve 44 and allow gas from the pressure controller to fill the fixed volume reservoir 40 during each cycle of the gas-assisted injection molding process. The controller 42 also controls a second valve member 46 which is positioned in the conduit 48 leading from the fixed volume reservoir 40 to the gas pin 24 and mold cavity 14. The controller 42 can be any type of conventional controller in use today, and preferably is a computerized controller which can be programmed to act in the manner described herein.

The system 10 also includes a variable flow control or restrictor 50 and a check valve 52. The flow restrictor 50 and check valve 52 are positioned in the conduit 48 between the fixed volume reservoir and the gas pin member 24.

A temperature sensor or sensing device 60, such as a thermocouple, is positioned in the mold 12 in order to sense the temperature of the molten plastic material as it flows out of the nozzle and into the mold cavity. The thermocouple 60 is connected to the controller 42 by a conduit or electrical lead 62. The thermocouple 60 can be incorporated into the gas pin 24 or positioned adjacent to it in the mold, as shown in FIG. 1.

In accordance with one preferred embodiment of the present invention, the thermocouple 60 is positioned in the gas pin member 24, as discussed below with reference to FIGS. 6 and 7. In this regard, the gas pin member 24 can be of any conventional type, such as a modified ejector pin mechanism.

The gas pin assembly as shown in FIG. 4 consists of a parting line removable shank and shaft combination with an associated adjacently positioned thermocouple for temperature sensing. The gas pin assembly also includes a tapered seal along with O-ring seals for improved pressurization capability.

Figure 2:
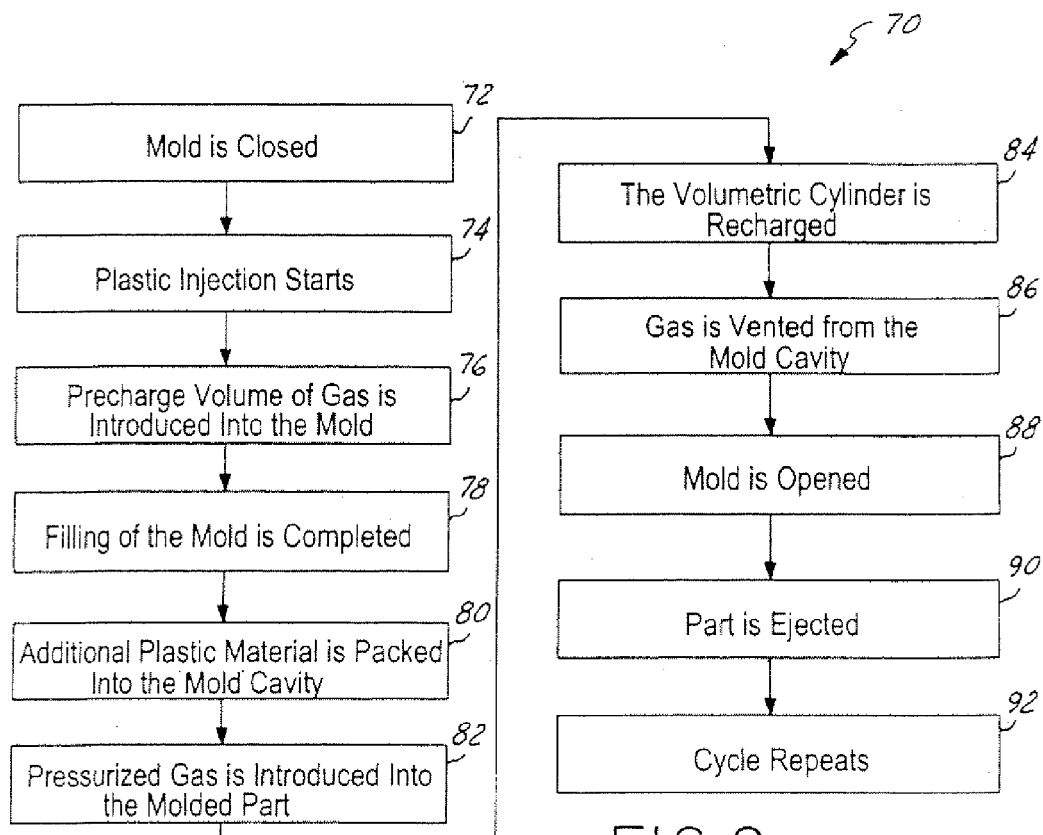
FIG. 2 is a flow chart depicting the elements of a preferred embodiment of the present invention.

A flow diagram of a preferred method or process in accordance with the present invention is shown in FIG. 2 and indicated generally by the reference numeral 70. In accordance with the inventive process, the mold 12 is closed by the injection molding machine. This is shown in Box 72.

Thereafter, the plastic injection is initiated by the injection molding machine into the mold cavity 14 in the mold. This is shown in Box 74. Thereafter, once the temperature sensor or thermocouple 60 senses a preset temperature of the melt flow of plastic material in the mold cavity as it is injected, the controller 42 operates the valve 46 and allows gas from the fixed volume reservoir or chamber 40 to be injected into the plastic material. This is shown in Box 76. The gas from the fixed volume reservoir enters the plastic material at a substantially low pressure, only overcoming the mold wall friction and slight plastic cooling. This forms an initial hollow chamber or void in the plastic material, and prevents the plastic from passing or "bursting" through the plastic material into the mold cavity.

Once all of the gas from the fixed volume reservoir 40 is introduced into the mold, the injection of the plastic material from the injection molding machine is continued until the mold is completely filled. This is shown in Box 78. Preferably, there is no hesitation or stoppage of the plastic injection during the introduction of the gas from the reservoir 40. Instead, the gas is simply introduced from the reservoir while the plastic injection is taking place. Once the mold is completely filled, additional plastic material is packed into the mold cavity in a conventional manner. This is shown in Box 80.

Pressurized gas from the pressure controller 32 is then introduced via conduit 33 into the molded part through the gas pin 24. The one-way check valve 52 in conduit 48 prevents gas from the pressure controller from being directed into the fixed volume reservoir. The introduction of the pressurized gas into the molded part is shown in Box 82.

The volumetric cylinder which is the fixed volume reservoir 40 is then recharged with gas from the pressure controller. The controller 42 closes the valve 46 and opens the valve 44 allowing the pressure controller to fill the fixed volume reservoir and establish a preset volume of gas for the next cycle. This is shown in Box 84.

Once the plastic material in the mold cavity has sufficiently cooled and solidified, the gas is vented or exhausted from the mold cavity. This is shown in Box 86. The gas can be vented from the mold cavity in any conventional manner, such as being vented or exhausted back through the gas pin 24.

The mold is then opened, as shown in Box 88 and the part is ejected from the mold cavity, as shown in Box 90. The part is ejected from the mold cavity in any conventional manner, such as by the use of one or more ejector pins (not shown). Thereafter, the plastic injection molding cycle is repeated, as shown in Box 92. At this point, the fixed volume reservoir 40 has been recharged and the mold 12 has been closed again, such that the plastic injection molding process can be initiated again.

The embodiment of the inventive system and process as described above is shown schematically in FIGS. 3A–3E. In these figures, a portion of the mold cavity 14 is shown, along with the map pocket 18 and associated rib member 20. The plastic material which is injected into the mold cavity from the injection molding machine is schematically shown by reference numeral 100, the gas which is introduced into the mold cavity by a gas pin is shown schematically by the reference numeral 102 and the thermocouple which is positioned adjacent the gas pin is shown schematically by reference numeral 104.

Figure 3A:
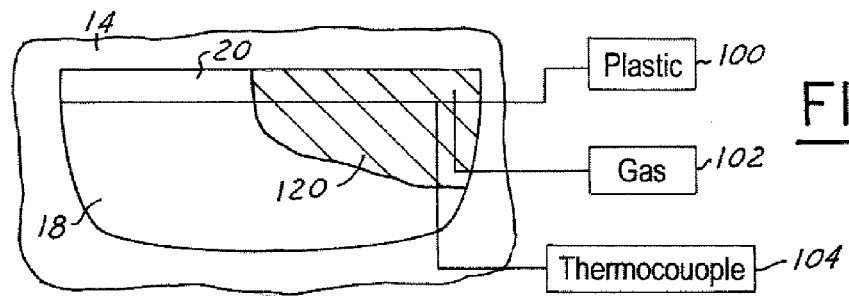
FIGS. 3A–3E illustrate steps in use of a preferred embodiment of the present invention.
Figure 3B:
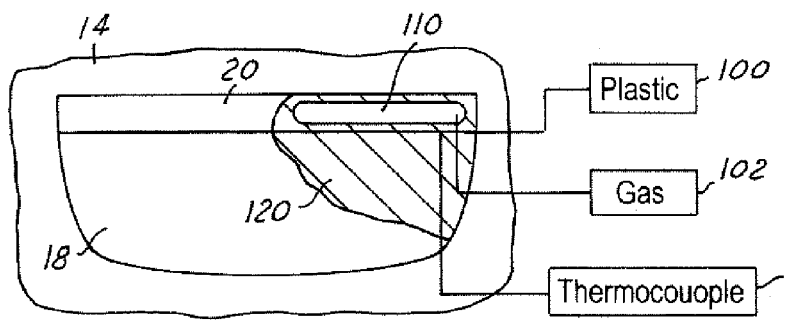

As shown in FIG. 3A, after the mold is closed, the injection of plastic material 120 is initiated. The plastic material 120 initially fills a portion of the map pocket area in the mold cavity as shown. Thereafter, as shown in FIG.

3B, the temperature of the plastic material 120 has been read by the thermocouple 104, and the gas from the fixed volume reservoir has been injected into the rib member 20. The hollow portion in the plastic material in the rib member formed by the gas from the fixed volume reservoir is shown by the reference numeral 110.

Figure 3C:
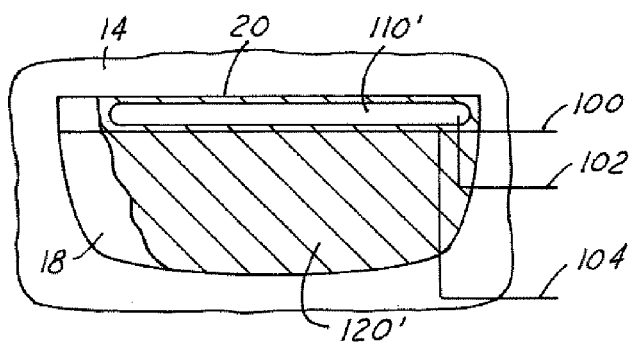

As additional plastic material 120' is forced into the mold cavity by the injection molding machine, the gas from the fixed volume reservoir which forms the initial hollow portion 110 expands as shown to form a larger hollow cavity 110'. This is depicted in FIG. 3C.

Figure 3D:
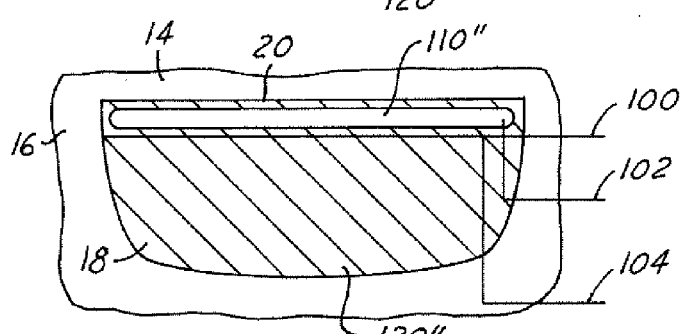

Thereafter, as the plastic material completely fills the mold cavity 14 forming the door panel 16 and completing the formation of the map pocket 18, as shown in FIG. 3D, the hollow portion 110" forms the desired full-length hollow cavity in the rib member. The plastic material is then packed in the mold cavity, completely forming and filling the door panel component 16.

Figure 3E:
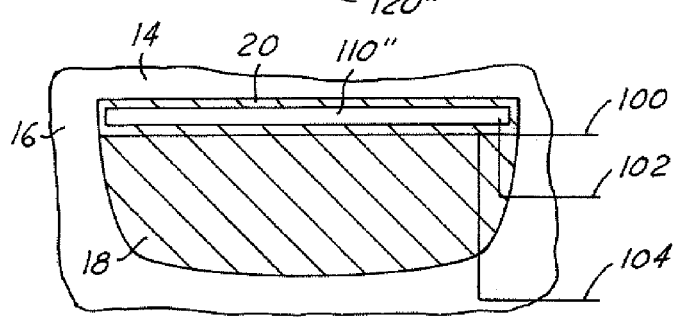

Finally, as shown in FIG. 3E, pressurized gas is injected through the gas pin from the pressure controller 32 which increases the pressure of the gas in the hollow chamber 110". This forces the plastic material against the walls of the mold cavity in the area of the rib member 20.

The primary purpose of the temperature sensor is to detect the flow of molten plastic in the mold cavity. The sensor is positioned and calibrated such that a sufficient volume of plastic material is present in the mold cavity so that gas from the fixed volume cavity can enter the plastic material in a smooth and uninterrupted manner and will not "blow out" through the melt front. This also insures that there will not be any hesitation marks on the molded product.

In accordance with the present invention, it is also possible to use other types of sensing devices to sense the flow of plastic material and initiate the injection of the fixed volume of gas. For example, fiber optic sensors or mirrors could be utilized. Either of those could be positioned in the mold cavity and utilized in a control system to trigger the release of the first volume of gas. If a fiber optic member was utilized, it should be positioned flush with or above the surface of the mold cavity in order to detect the presence of plastic material.

With the first gas volume being supplied from a fixed volume reservoir or chamber, the gas pressure in the hollow void formed in the plastic material will decrease as the gas is injected and contained in the plastic material. This eliminates the possibility of the gas overcoming the injected plastic as it is being injected and causing a blow out.

One preferred embodiment of a gas pin member and associated thermocouple member is shown in FIG. 4. The gas pin member 24A is positioned in a bore or cavity 130 in the mold 12. The gas pin member 24 includes an outer shank member or body member 132 and an inner shaft member 134. Shaft member 134 is secured in the outer body member 132 by mating thread members 136. The upper end 132A of the body member 132 and upper end 134A of the shaft member 134 are machined in order to create a small annular opening D, as shown in FIG. 4B. The opening D allows the gas to be injected into the mold cavity 14, but is too small to allow plastic material to enter back into the gas pin.

The outer body member 132 which is preferably cylindrical is received and secured in an insert or bushing member 138 by a series of mating thread members 142. Seal members, such as O-Ring member 144 are used to seal the gas pin member 124 in the insert member 138.

A thermocouple 60 is positioned in a bore or channel 150 in the insert member 138. Thermocouple 60 is preferably positioned adjacent the gas pin member 24, as well as adjacent the entry of the plastic material into the mold cavity, in order to effectively read the temperature of the melt front and trigger the release of the low pressure gas from the fixed volume reservoir 40. In this regard, the thermocouple member 60 can be positioned at any desired or acceptable distance 152 from the surface of the mold cavity 14. The distance 152 is selected depending on many factors, such as the type of plastic material being utilized, the shape of the component, the size of the mold cavity and the hollow portion, and the like. The thermocouple is connected by an appropriate electrical conduit or lead 154 to the controller 42.

In order to allow gas from the conduit or channel 33 to pass through the outer body member 132 and around the inner shaft member 134, one or more openings or "flats" 160 are provided on the lower end 134B of the shaft member 134. This is shown in FIG. 4A.

In order to allow the thermocouple 60 to be accurately positioned relative to the surface of the mold cavity for various parts and materials, it is possible to provide a mechanism which allows movement of the thermocouple in its channel or bore. This is shown in FIG. 5. The thermocouple 160 is positioned in bore or cavity 162 and is moveable by mechanism 164 in the direction of the arrows 166. The surface of the mold cavity is shown by reference numeral 14'.

Figure 6:
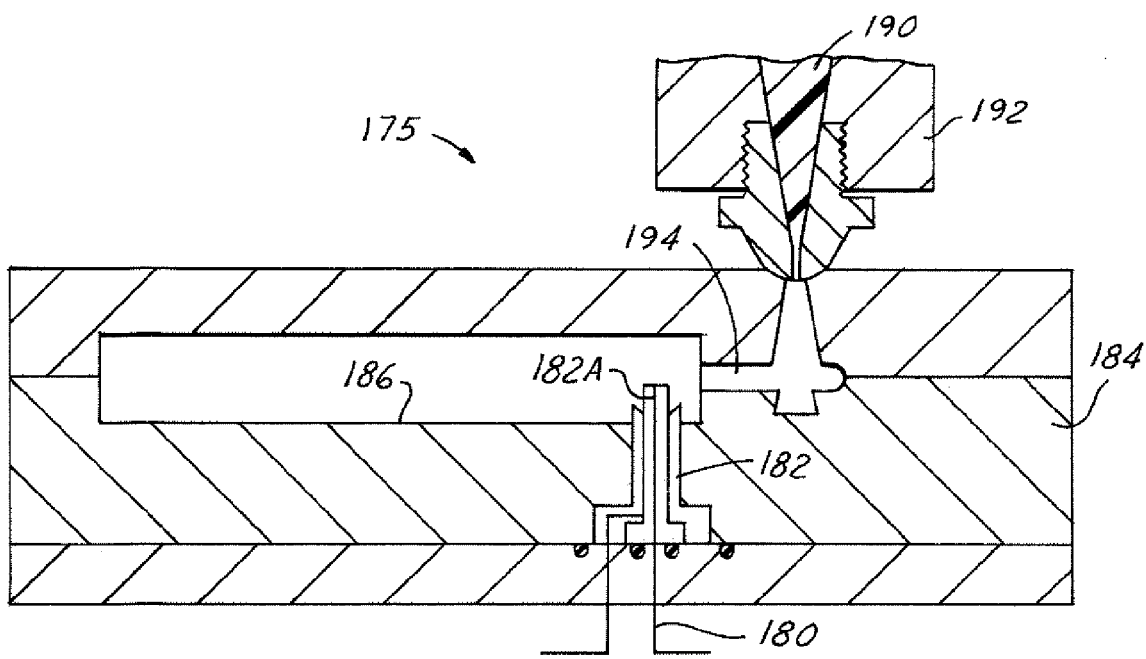
FIG. 6 illustrates an alternate embodiment of the present invention.
Figure 7:
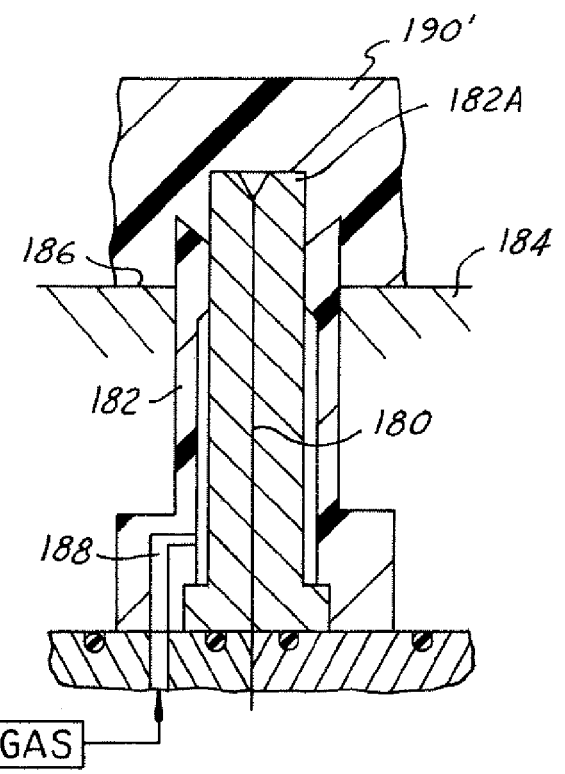
FIG. 7 is an enlarged view of a combined gas pin and thermocouple of the type shown in FIG. 6.

Another embodiment of the present invention is shown in FIGS. 6 and 7. In this embodiment 175, thermocouple member 180 is included as part of the gas pin member 182. The gas pin member 182 is positioned in mold 184 with its upper end 182A protruding into the mold cavity 186. Gas is introduced into the gas pin member 182 through channel or conduit 188.

In the embodiment 175 illustrated in FIG. 6, the plastic material 190 is injected from the injection molding machine nozzle 192 into the mold cavity 186 through a runner 194. Plastic material in the mold cavity is shown in FIG. 7 and indicated by the reference numeral 190'.

By utilizing a pre-charged volume cylinder of gas with a flow control and check valve in conjunction with a thermocouple (or other temperature sensing device) located in the mold, the plastic material is displaced from the thicker section of the mold cavity into the nominal wall without gas permeation into the nominal wall. The volume control system is separated from the pressure control system by one or more check valves.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

The invention claimed is:

1. A method of forming an injection molded part in a mold cavity comprising:
   initiating injecting plastic material into the mold cavity;
   introducing a first volume of gas into the plastic material in the mold cavity, said first volume of gas being introduced from a fixed volume reservoir and forming a hollow cavity in the plastic material;
   continuing to inject plastic material into the mold cavity until the mold cavity is filled;
   packing the plastic material in the mold cavity; and
   injecting a second volume of gas into the plastic material.

2. The method as described in claim 1 wherein said second volume of gas is introduced into said hollow cavity.

3. The method as described in claim 1 wherein said first volume of gas has a first quantity of gas material at a first pressure and said second volume of gas has a second quantity of gas material at a second pressure, said first pressure is less than said second pressure.

4. The method as described in claim 3 wherein said first pressure is insufficient to cause the gas to pass through said plastic material and into said mold cavity.

5. The method as described in claim 1 wherein said first volume of gas has a first quantity of gas material at a first pressure and said second volume of gas has a second quantity of gas material at a second pressure, said first pressure being less than said second pressure and said first quantity of gas material being less than said second quantity of gas material.

6. The method as described in claim 5 wherein said first pressure is insufficient to cause the gas to pass through said plastic material and into said mold cavity.

7. The method as described in claim 1 wherein said introduction of the first volume of gas is initiated based on the temperature of the plastic material in the mold cavity.

8. The method as described in claim 1 further comprising the step of determining the temperature of the plastic material in the mold cavity, and wherein said introduction of the first volume of gas is initiated when said temperature reaches a predetermined amount.

9. The method as described in claim 8 wherein the temperature of the plastic material is determined by a thermocouple positioned adjacent the mold cavity.

10. The method as described in claim 1 further comprising the steps of allowing the plastic material in the mold cavity to cool and at least partially solidify to form a molded plastic product, venting the first and second volumes of gas from the plastic product, and ejecting the plastic product from the mold cavity.

11. The method as described in claim 10 further comprising the step of recharging the fixed volume reservoir with another volume of gas.

12. The method as described in claim 1 wherein said introduction of a first volume of gas into the plastic material comprises determining the temperature of the plastic material in the mold cavity and operating a first valve mechanism to release said first volume of gas from said fixed volume reservoir.

13. The method as described in claim 1 further comprising the step of positioning a temperature sensing device adjacent said mold cavity and utilizing said device to measure the temperature of the plastic material in the mold cavity, and wherein the first volume of gas is not initiated until a predetermined temperature is measured by said device.

14. The method as described in claim 13 further comprising the step of varying the position of the temperature sensing device relative to the mold cavity in order to regulate the initiation of the introduction of the first volume of gas.

15. The method as described in claim 13 wherein said first volume of gas is introduced into said mold cavity by a gas pin member.

16. The method as described in claim 13 wherein said second volume of gas is injected into said mold cavity by said gas pin member.

17. A method of forming an injection molded part in a mold cavity comprising:
    charging a first volume of gas in a fixed volume reservoir;
    introducing a first volume of plastic material into the mold cavity;
    determining the temperature of said plastic material in the mold cavity;
    introducing said first volume of gas into said first volume of plastic material when said temperature of said plastic material reaches a predetermined value, said first volume of gas forming a hollow cavity in said plastic material;
    filling said mold cavity with plastic material;
    injecting a second volume of gas into the hollow cavity in said plastic material;
    allowing said plastic material to cool;
    venting at least said second volume of gas from said plastic material; and
    removing said cooled plastic material from said mold cavity.

18. The method as described in claim 17 further comprising the steps of recharging said first volume of gas in said fixed volume reservoir.

19. The method as described in claim 17 further comprising the step of repeating the molding cycle to form another injection molded part.

20. A system for forming an injection molded part in a mold, said system comprising:
    a mold having a mold cavity in the shape of the part;
    an injection molding machine for injecting plastic material into the mold cavity;
    a gas pin positioned in said mold for injecting gas into said mold cavity;
    a sensing device positioned in said mold adjacent said mold cavity for detecting the presence of plastic material injected into said mold cavity;
    a fixed volume reservoir for introducing a first volume of gas into plastic material in the mold cavity;
    a control mechanism for allowing gas from said fixed volume reservoir to pass into the mold cavity upon detection of plastic material in the mold by said sensing device;
    a supply of gas for introducing a second volume of gas into the plastic material in the mold cavity; and
    a gas controller for use in introducing a second volume of gas into the plastic material.

* * * * *

UNITED STATES PATENT AND TRADEMARK OFFICE
CERTIFICATE OF CORRECTION

PATENT NO. : 7,182,892 B2 Page 1 of 1
APPLICATION NO. : 10/709390
DATED : February 27, 2007
INVENTOR(S) : Gregory A. Homann and James Hendry It is certified that error appears in the above-identified patent and that said Letters Patent is hereby corrected as shown below:

On the Title Page Item
(75) Inventors: Delete "Holmann" and insert -- Homann --.

Signed and Sealed this

Tenth Day of July, 2007

JON W. DUDAS
*Director of the United States Patent and Trademark Office*